US011672291B2

(12) United States Patent
Zhang et al.

(10) Patent No.: US 11,672,291 B2
(45) Date of Patent: Jun. 13, 2023

(54) BIOLOGICAL METHOD FOR FORMING GRIP SURFACE DURING GLOVE MANUFACTURE

(71) Applicant: HONEYWELL INTERNATIONAL INC., Morris Plains, NJ (US)

(72) Inventors: Jing Zhang, Morris Plains, NJ (US); Tianshi Ye, Morris Plains, NJ (US); Weiwei Ding, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 451 days.

(21) Appl. No.: 16/765,312

(22) PCT Filed: Nov. 30, 2017

(86) PCT No.: PCT/CN2017/113928
§ 371 (c)(1),
(2) Date: May 19, 2020

(87) PCT Pub. No.: WO2019/104636
PCT Pub. Date: Jun. 6, 2019

(65) Prior Publication Data
US 2020/0352266 A1 Nov. 12, 2020

(51) Int. Cl.
A41D 19/015 (2006.01)
B29C 41/14 (2006.01)
B29K 33/18 (2006.01)
B29L 31/48 (2006.01)

(52) U.S. Cl.
CPC ........ *A41D 19/01547* (2013.01); *B29C 41/14* (2013.01); *B29K 2033/18* (2013.01); *B29L 2031/4864* (2013.01)

(58) Field of Classification Search
CPC .............. A41D 19/01547; B29C 41/14; B29K 2033/18; B29L 2031/4864
(Continued)

(56) References Cited

U.S. PATENT DOCUMENTS 3,268,458 A 8/1966 Strauss et al.
6,527,990 B2 3/2003 Yamashita et al.
(Continued)

FOREIGN PATENT DOCUMENTS

CA 2207919 5/1998
CN 1270970 A 10/2000
(Continued)

OTHER PUBLICATIONS

International Search Report of the International Searching Authority for PCT/CN2017/113928 dated Aug. 31, 2018.
(Continued)

Primary Examiner — Gloria M Hale
(74) Attorney, Agent, or Firm — Alston & Bird LLP

(57) ABSTRACT

Systems and methods for creating a grip surface (104) of a protectant glove (100). The method may comprise dipping a glove mold into a coagulant material (206); dipping the glove mold into a nitrile coating formulation to form an outer surface of the glove (208), wherein a biodegradable material is distributed throughout the nitrile coating formulation; vulcanizing at least the outer surface of the glove to form a protectant outer surface (212); washing at least the outer surface of the glove with an enzyme solution; decomposing, by the enzyme solution, the biodegradable material that is distributed throughout the outer surface of the glove, thereby forming a grip surface of the glove comprising an open-cell structure within the outer surface (216); and drying the glove to form a final glove comprising the grip surface (218).

15 Claims, 3 Drawing Sheets

(58) Field of Classification Search
USPC .......................................................... 2/161.8
See application file for complete search history.

(56) References Cited

U.S. PATENT DOCUMENTS

| | | | |
|---|---|---|---|
| 6,875,391 | B2 | 4/2005 | Modha et al. |
| 7,173,070 | B2 | 2/2007 | Koffler |
| 8,563,103 | B2 | 10/2013 | Hamann et al. |
| 2001/0011387 | A1 | 8/2001 | Yamashita et al. |
| 2008/0050520 | A1 | 2/2008 | Hubbuch et al. |
| 2014/0142211 | A1 | 5/2014 | Stoever et al. |
| 2016/0262469 | A1* | 9/2016 | Fernando ................. D04B 1/28 |
| 2017/0332714 | A1* | 11/2017 | Gutiérrez ................ B29C 35/02 |

FOREIGN PATENT DOCUMENTS

| | | |
|---|---|---|
| CN | 202375101 U | 8/2012 |
| CN | 103284361 A | 9/2013 |
| EP | 1923403 A1 | 5/2008 |
| EP | 2143551 A1 | 1/2010 |
| JP | 2001207314 A | 8/2001 |
| WO | 2005/002375 A1 | 1/2005 |

OTHER PUBLICATIONS

Office Action received for European Application No. 17933319.0, dated Aug. 23, 2022, 5 pages.
Communication Pursuant to Rules 161 (2) and 162 for European Patent Application No. 17933319.0 dated Jul. 8, 2020, 3 pages.
Lu et al., Starch-Based Completely Biodegradable Polymer Materials, [online, article] 2009, [retrieved on Jul. 17, 2020] retrieved from the Internet URL: https://www.google.com/search?q=Starch-based+completely+biodegradable+polymer+materialswww.expresspolymlett.com.
European Search Report and Search Opinion Received for EP Application No. 17933319.0, dated Jun. 15, 2021, 9 pages.

* cited by examiner

BIOLOGICAL METHOD FOR FORMING GRIP SURFACE DURING GLOVE MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Seamless, three-dimensional gloves may be formed using a glove form (or mold) and dipping the glove into a liquidized material that may dry to form the glove material. Such gloves may be used to protect a user's hands from chemicals, dust, grease, or other harmful substances. These gloves may be formed in various sizes to accommodate the user.

SUMMARY

In an embodiment, a method of forming a grip surface of a glove may comprise dipping a glove mold into a coagulant material; dipping the glove mold into a nitrile coating formulation to form an outer surface of the glove, wherein a biodegradable material is distributed throughout the nitrile coating formulation; vulcanizing at least the outer surface of the glove to form a protectant outer surface; washing at least the outer surface of the glove with an enzyme solution; decomposing, by the enzyme solution, the biodegradable material that is distributed throughout the outer surface of the glove, thereby forming a grip surface of the glove comprising an open-cell structure within the outer surface; and drying the glove to form a final glove comprising the grip surface.

In an embodiment, a protectant glove may comprise a grip surface forming at least a portion of an outer layer of the glove, wherein the grip surface comprises a vulcanized nitrile material; and a plurality of open-cell walls defined by the vulcanized nitrile material, wherein the plurality of open-cell walls are formed around a plurality of biodegradable particles dispersed throughout the vulcanized nitrile material that are decomposed during the manufacture of the glove.

In an embodiment, a method of forming a protectant glove may comprise mixing a nitrile coating formulation comprising a nitrile emulsion and a plurality of biodegradable particles distributed throughout the nitrile emulsion; dipping a glove mold into the nitrile coating formulation to form an outer surface of the glove; vulcanizing at least the outer surface of the glove to form a grip surface; forming open-cell walls via the vulcanized nitrile emulsion formed about the plurality of biodegradable particles; washing at least the outer surface of the glove with an enzyme solution; and decomposing, by the enzyme solution, the biodegradable particles that are distributed throughout the outer surface of the glove, thereby forming a grip surface comprising the open-cell walls of the nitrile emulsion of the outer surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
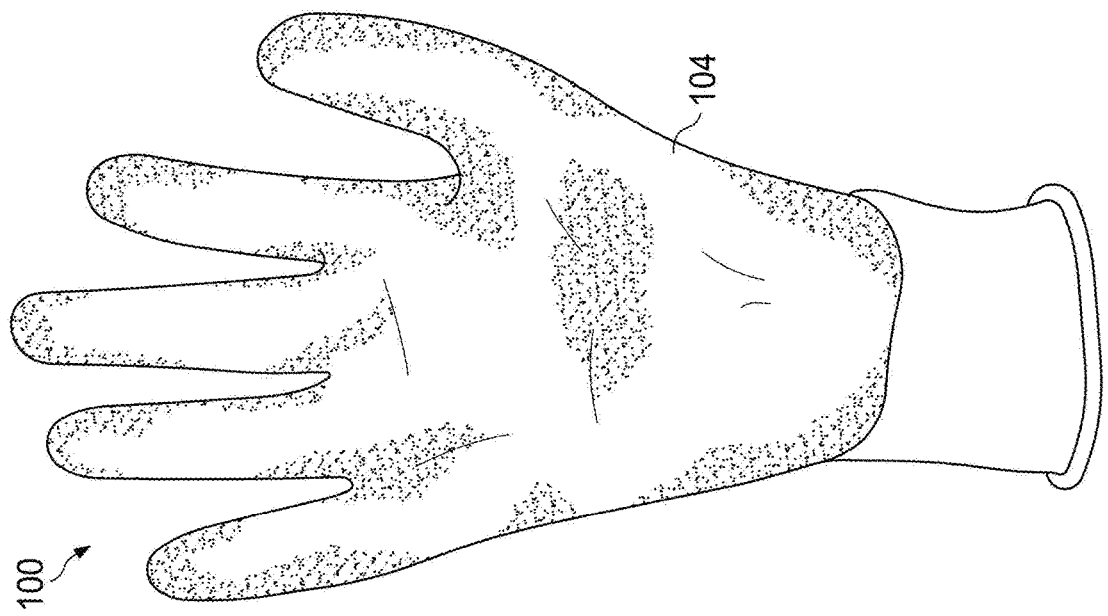
FIGS. 1A-1B illustrate front and back views of a protectant glove comprising a grip surface according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for forming a glove, where the glove may be a protective glove comprising an improved gripping outer surface. The grip characteristics of a glove are important, particularly when the glove is being worn for work with slick substances, such as water, oil, and/or other liquids. It is known in the art that coating the outer surface of a glove with a rough texture may improve the grip characteristics of the glove.

Therefore, glove manufacturers may desire methods to produce gloves with improved grip coating. Typically, mechanical foaming and chemical foaming are methods that may be used to form a texturized outer surface on at least a portion of a glove. The "foaming" methods create one or more bubbles within the surface material of the glove, where the bubbles can create a rough, texturized surface upon completion of the manufacturing process (possibly by trapping the bubbles within the material).

Embodiments of the disclosure include a biological method for foaming the outer surface material of a glove. This biological foaming method may comprise adding biodegradable material (e.g., a starch) to a coating formulation, where the glove may be dipped into the coating formulation to form the outer surface of the glove. During a final washing procedure, a certain amount of an enzyme may be added to the washing water, where the enzyme may cause the biodegradable material within the coating material to decompose during washing. The decomposition of the biodegradable material may generate a plurality of cavities within the coating material, where the cavity size and density may be controlled by adjusting the type of biodegradable material, the size of the biodegradable particles, the amount of biodegradable particles, and/or the enzyme washing procedure.

Figure 1B:
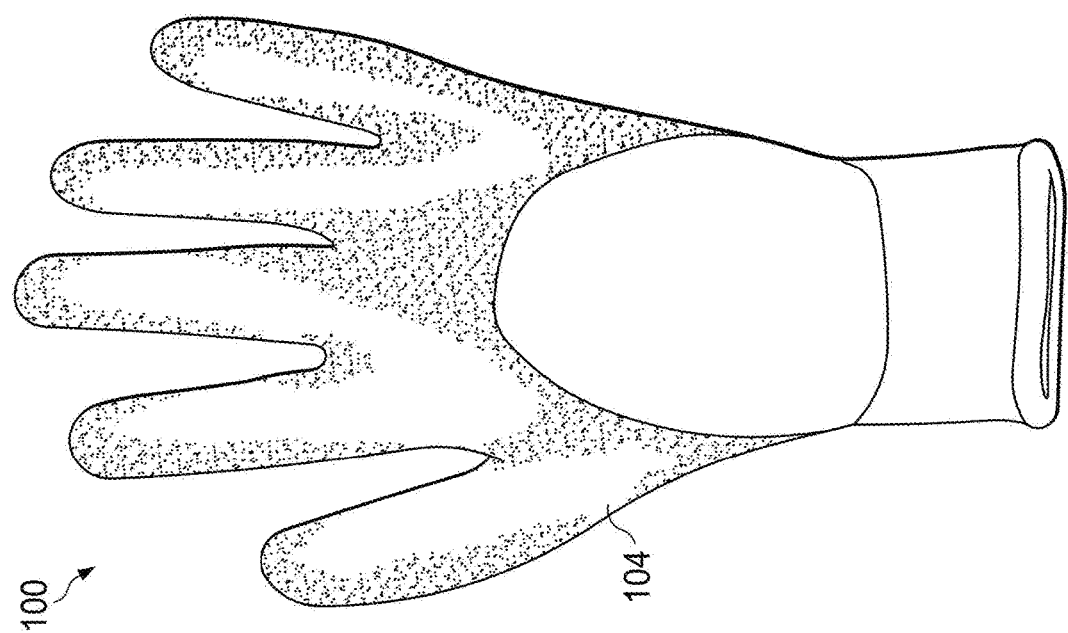

FIGS. 1A-1B illustrate an exemplary glove 100 according to an embodiment of the disclosure, where the glove 100 may comprise a grip surface 104 that covers at least a portion of the outer surface of the glove 100. The grip surface 104 may ensure that the user can safety grip objects while wearing the glove 100, even when working with slick substances. In the embodiment shown in FIGS. 1A-1B, the grip surface 104 may only cover a portion of the outer surface of the glove 100, while in other embodiments the grip surface 104 may cover the entire outer surface of the glove 100.

Figure 2:
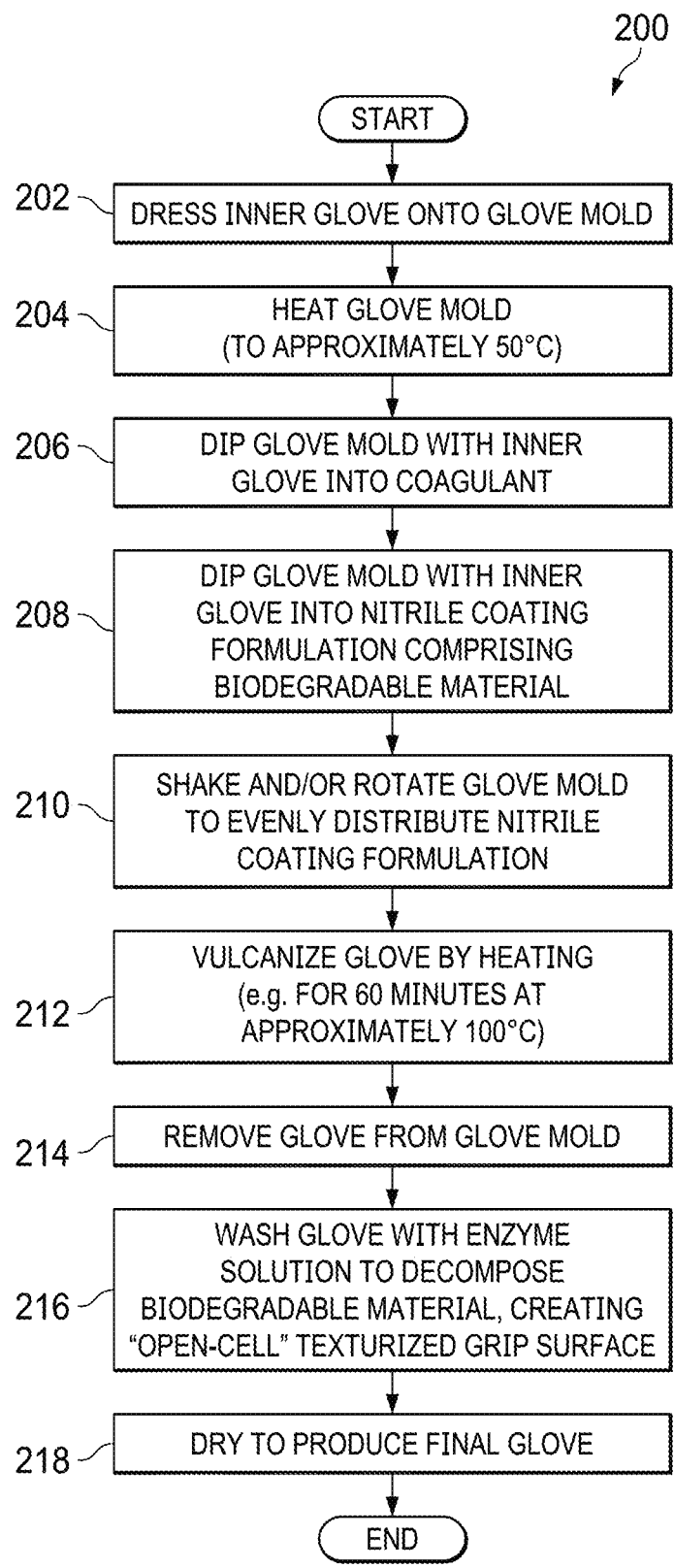
FIG. 2 illustrates a method of forming a protectant glove according to an embodiment of the disclosure.

Referring to FIG. 2, a method 200 of forming the glove 100 (described in FIGS. 1A-1B) is shown. The method 200 may comprise, at step 202, dressing an inner glove onto a glove mold (which may comprise a metal mold), wherein the inner glove may comprise a material that will eventually form the inner surface of the glove 100. At step 204, the glove mold may be heated to approximately 50° C. before the steps of the dipping process. At step 206, the mold with the inner glove may be dipped into a coagulant. The coagulant may comprise approximately 98% solvent (water, methanol, etc.) and approximately 2% calcium nitrate.

At step 208, the mold with the inner glove may be dipped into a nitrile coating formulation, where the nitrile coating formulation may comprise a biodegradable material (as described above). The biodegradable material may be evenly distributed within the nitrile coating formulation. The biodegradable material may comprise one or more of the following: starch, protein, cellulose, grease, and/or other similar biodegradable materials. In an exemplary embodiment, the nitrile coating formulation may comprise the following: 1000 grams (g) of nitrile emulsion, 50-300 g of 33% starch dispersion in water (i.e., the biodegradable material), 1-10 g of 50% sulfur dispersion in water, 1-10 g of 50% Zinc Diethyl Dithiocarbamate (ZDEC) dispersion in water, 5-30 g of 50% Zinc Oxide (ZnO) dispersion in water, 1-10 g of pigment, and/or 1-10 g of viscosity modifiers (e.g. 2% carboxymethylcellulose (CMC)).

In some embodiments, at step 210, the glove mold may be shaken and/or rotated to evenly distribute the nitrile coating formulation about the outer surface of the glove. At step 212, the glove and dipped layers may be vulcanized by heating, where the time and temperature for vulcanization may depend on the exact formulation used in the layers of the glove (e.g., for approximately 60 minutes at approximately 100° C.). The vulcanization may create a protectant outer layer of the glove of vulcanized nitrile material, wherein the vulcanized nitrile material may be resistant to harmful substances. At step 214, the glove may be removed from the glove mold. In some embodiments, the glove may be removed from the glove mold at a different stage in the method 200.

At step 216, the glove may be washed with an enzyme solution in water to decompose the biodegradable material that is present in the outermost layer of the glove (e.g., via the nitrile coating in step 208). The enzyme may cause the biodegradable material to decompose to a polysaccharide that is then washed out of the glove material by the water of the washing solution (e.g., where the washing water may be approximately 60° C.). The enzyme may be functional to decompose (or otherwise remove) the biodegradable material without affecting or damaging any of the other materials of the glove. The enzyme may comprise one or more of the following: amylase, protease, cellulase, lipase, and/or other similar enzymes configured to decompose the biodegradable material within the nitrile coating. In some embodiments, the enzyme may comprise amylace. When the biodegradable material decomposes, a plurality of open-cell walls may be left within the vulcanized nitrile material of the outer surface of the glove. The size and distribution of these open-cell walls may depend on the size of the biodegradable particle that is used and the concentration of the biodegradable particles within the nitrile coating formulation. The other materials of the nitrile coating formulation may create the walls surrounding the open cells, and may be solidified during the vulcanization process, so that when the biodegradable particles are decomposed, the walls of the open cells do not collapse. At step 218, the glove may be dried to form the final glove, which may undergo further processing to apply logos, labels, identification information, etc.

By incorporating a biodegradable material, such as starch, into the outer surface material of the glove, an open-cell texturized material can be formed by decomposing and/or dissolving the biodegradable material, leaving shells or holes where the particles were located within the outer surface material. The "shell" may be the remaining material of the surface material after the biodegradable material has been decomposed. The resulting texturized surface may provide improved grip characteristics. Additionally, because the starch is biodegradable, there are reduced environmental concerns with washing the starch out of the glove during the manufacture of the glove.

Figure 3:
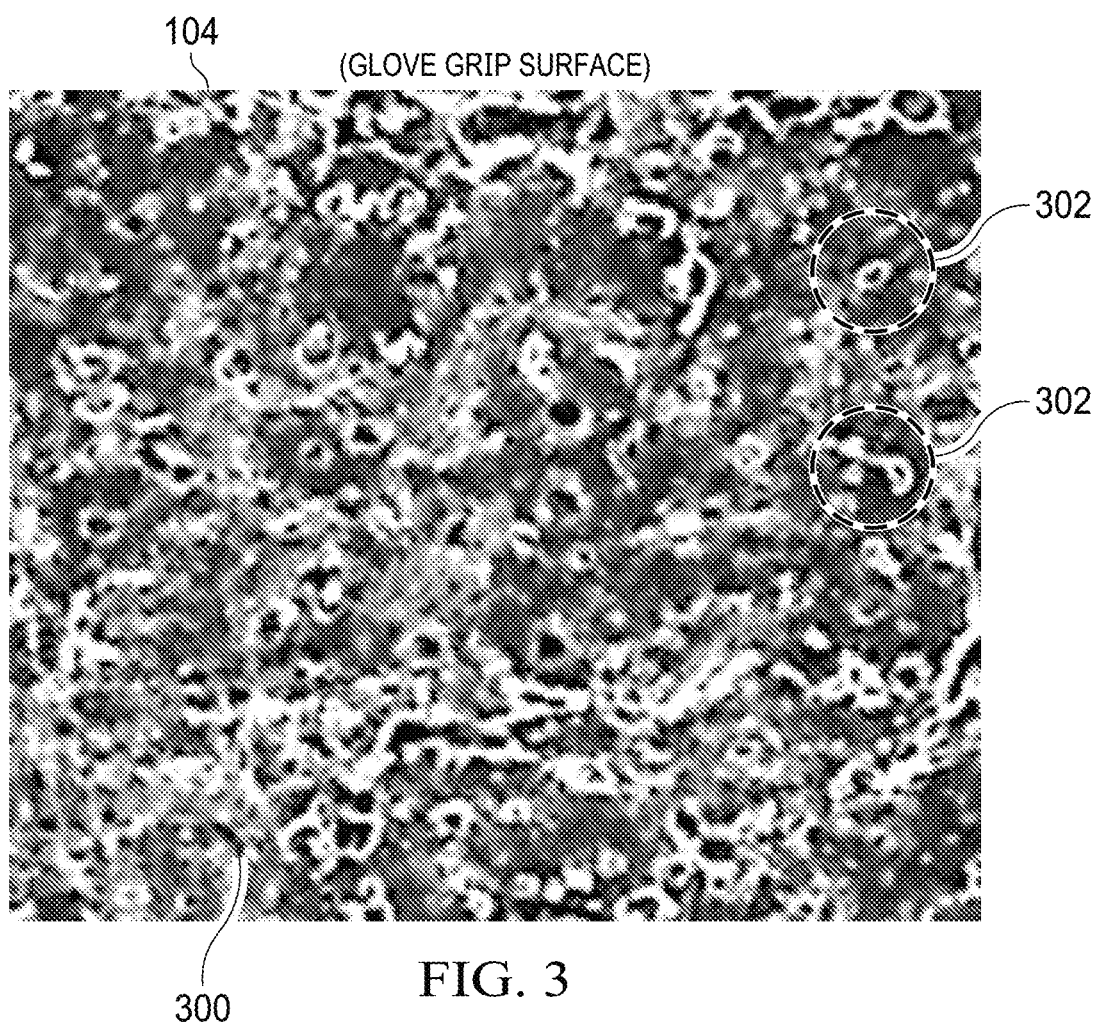
FIG. 3 illustrates a detailed view of a grip surface of a glove according to an embodiment of the disclosure.

FIG. 3 illustrates a detailed view of the texturized grip surface 104 that may be formed using the above described method 200 using a vulcanized nitrile material 300. The open-cell texture may provide improved grip for a user. The grip surface 104 may comprise a plurality of open-cell walls 302 dispersed throughout and defined by the vulcanized nitrile material 300. During the manufacture method 200 described above, the open-cell walls 302 may be formed around a plurality of biodegradable particles dispersed throughout the nitrile material, and when the nitrile material is vulcanized, these walls may be solidified in shape and size by forming around the biodegradable particles. Then, once the biodegradable particles are decomposed, the open-cell walls 302 may remain in the vulcanized nitrile material, creating the texturized grip surface 104 of the glove.

Having described various devices and methods herein, exemplary embodiments or aspects can include, but are not limited to:

In a first embodiment, a method of forming a grip surface of a glove may comprise dipping a glove mold into a coagulant material; dipping the glove mold into a nitrile coating formulation to form an outer surface of the glove, wherein a biodegradable material is distributed throughout the nitrile coating formulation; vulcanizing at least the outer surface of the glove to form a protective outer surface; washing at least the outer surface of the glove with an enzyme solution; decomposing, by the enzyme solution, the biodegradable material that is distributed throughout the outer surface of the glove, thereby forming a grip surface of the glove comprising an open-cell structure within the outer surface; and drying the glove to form a final glove comprising the grip surface.

A second embodiment can include the method of the first embodiment, wherein vulcanizing at least the outer surface comprises forming open-cell walls around a plurality of particles of the biodegradable material, and wherein, after decomposing the biodegradable material, the open-cell walls remain to form the grip surface of the glove.

A third embodiment can include the method of the first or second embodiments, further comprising dressing an inner glove onto the glove mold before dipping the glove mold into the coagulant material, wherein the inner glove forms an inner surface of the glove when worn by a user.

A fourth embodiment can include the method of any of the first through third embodiments, further comprising removing the glove from the glove mold before washing at least the outer surface of the glove with the enzyme solution.

A fifth embodiment can include the method of any of the first through fourth embodiments, wherein the coagulant material comprises approximately 98% solvent and approximately 2% calcium nitrate.

A sixth embodiment can include the method of any of the first through fifth embodiments, further comprising heating the glove mold to approximately 50° C. before dipping into the coagulant material.

A seventh embodiment can include the method of any of the first through sixth embodiments, wherein the nitrile coating formulation comprises between approximately 50-300 grams of a 33% starch dispersion in water.

An eighth embodiment can include the method of any of the first through seventh embodiments, wherein the nitrile coating formulation comprises a ratio of nitrile emulsion to starch dispersion in water between approximately 20:1 and approximately 3:1.

A ninth embodiment can include the method of the eighth embodiment, wherein vulcanizing at least the outer surface of the glove comprises vulcanizing the nitrile emulsion of the nitrile coating formulation.

A tenth embodiment can include the method of any of the first through ninth embodiments, wherein the nitrile coating formulation comprises one or more of the following: approximately 1000 grams of nitrile emulsion, between approximately 50-300 grams of 33% starch dispersion in water, between approximately 1-10 grams of 50% sulfur dispersion in water, between approximately 1-10 grams of 50% Zinc Diethyl Dithiocarbamate (ZDEC) dispersion in water, and between approximately 5-30 grams of 50% Zinc Oxide (ZnO) dispersion in water.

In an eleventh embodiment, a protectant glove may comprise a grip surface forming at least a portion of an outer layer of the glove, wherein the grip surface comprises a vulcanized nitrile material; and a plurality of open-cell walls defined by the vulcanized nitrile material, wherein the plurality of open-cell walls are formed around a plurality of biodegradable particles dispersed throughout the vulcanized nitrile material that are decomposed during the manufacture of the glove.

A twelfth embodiment can include the electrochemical sensor of the eleventh embodiment, further comprising an inner glove upon which the grip surface is formed.

A thirteenth embodiment can include the electrochemical sensor of the eleventh or twelfth embodiments, wherein the open-cell walls are formed during an enzyme wash of the glove, wherein the enzyme is configured to decompose or otherwise remove the biodegradable particles from the vulcanized nitrile material.

A fourteenth embodiment can include the electrochemical sensor of any of the eleventh through thirteenth embodiments, wherein the grip surface comprises fingers and a palm of the glove.

A fifteenth embodiment can include the electrochemical sensor of any of the eleventh through fourteenth embodiments, wherein the grip surface comprises the entire outer layer of the glove.

In a sixteenth embodiment, a method of forming a protectant glove may comprise mixing a nitrile coating formulation comprising a nitrile emulsion and a plurality of biodegradable particles distributed throughout the nitrile emulsion; dipping a glove mold into the nitrile coating formulation to form an outer surface of the glove; vulcanizing at least the outer surface of the glove to form a grip surface; forming open-cell walls via the vulcanized nitrile emulsion formed about the plurality of biodegradable particles; washing at least the outer surface of the glove with an enzyme solution; and decomposing, by the enzyme solution, the biodegradable particles that are distributed throughout the outer surface of the glove, thereby forming a grip surface comprising the open-cell walls of the nitrile emulsion of the outer surface.

A seventeenth embodiment can include the method of the sixteenth embodiment, further comprising dipping the glove mold into a coagulant material before dipping the glove mold into the nitrile coating.

An eighteenth embodiment can include the method of the sixteenth or seventeenth embodiments, further comprising drying the glove to form a final glove comprising the grip surface.

A nineteenth embodiment can include the method of any of the sixteenth through eighteenth embodiments, wherein the enzyme solution comprises amylace.

A twentieth embodiment can include the method of any of the sixteenth through nineteenth embodiments, wherein dipping the glove mold comprises dipping at least the fingers and palm of the glove mold.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of forming a grip surface of a glove, the method comprising:
   dipping a glove mold into a coagulant material;
   dipping the glove mold into a nitrile coating formulation to form an outer surface of the glove, wherein a biodegradable material is distributed throughout the nitrile coating formulation;
   vulcanizing at least the outer surface of the glove to form a protective outer surface;
   washing at least the outer surface of the glove with an enzyme solution;
   decomposing, by the enzyme solution, the biodegradable material that is distributed throughout the outer surface of the glove, thereby forming a grip surface of the glove comprising an open-cell structure within the outer surface; and
   drying the glove to form a final glove comprising the grip surface.

2. The method of claim 1, wherein vulcanizing at least the outer surface comprises forming open-cell walls around a plurality of particles of the biodegradable material, and wherein, after decomposing the biodegradable material, the open-cell walls remain to form the grip surface of the glove.

3. The method of claim 1, further comprising dressing an inner glove onto the glove mold before dipping the glove mold into the coagulant material, wherein the inner glove forms an inner surface of the glove when worn by a user.

4. The method of claim 1, further comprising removing the glove from the glove mold before washing at least the outer surface of the glove with the enzyme solution.

5. The method of claim 1, wherein the coagulant material comprises approximately 98% solvent and approximately 2% calcium nitrate.

6. The method of claim 1, further comprising heating the glove mold to approximately 50° C. before dipping into the coagulant material.

7. The method of claim 1, wherein the nitrile coating formulation comprises between approximately 50-300 grams of a 33% starch dispersion in water.

8. The method of claim 1, wherein the nitrile coating formulation comprises a ratio of nitrile emulsion to starch dispersion in water between approximately 20:1 and approximately 3:1.

9. The method of claim 8, wherein vulcanizing at least the outer surface of the glove comprises vulcanizing the nitrile emulsion of the nitrile coating formulation.

10. The method of claim 1, wherein the nitrile coating formulation comprises one or more of the following: approximately 1000 grams of nitrile emulsion, between approximately 50-300 grams of 33% starch dispersion in water, between approximately 1-10 grams of 50% sulfur dispersion in water, between approximately 1-10 grams of 50% Zinc Diethyl Dithiocarbamate (ZDEC) dispersion in water, and between approximately 5-30 grams of 50% Zinc Oxide (ZnO) dispersion in water.

11. A method of forming a protectant glove, the method comprising:
   mixing a nitrile coating formulation comprising a nitrile emulsion and a plurality of biodegradable particles distributed throughout the nitrile emulsion;
   dipping a glove mold into the nitrile coating formulation to form an outer surface of the glove;
   vulcanizing at least the outer surface of the glove to form a grip surface;
   forming open-cell walls via the vulcanized nitrile emulsion formed about the plurality of biodegradable particles;
   washing at least the outer surface of the glove with an enzyme solution; and
   decomposing, by the enzyme solution, the biodegradable particles that are distributed throughout the outer surface of the glove, thereby forming a grip surface comprising the open-cell walls of the nitrile emulsion of the outer surface.

12. The method of claim 11, further comprising dipping the glove mold into a coagulant material before dipping the glove mold into the nitrile coating.

13. The method of claim 11, further comprising drying the glove to form a final glove comprising the grip surface.

14. The method of claim 11, wherein the enzyme solution comprises amylace.

15. The method of claim 11, wherein dipping the glove mold comprises dipping at least the fingers and palm of the glove mold.

\* \* \* \* \*